US011039465B2

(12) United States Patent
Huang et al.

(10) Patent No.: US 11,039,465 B2
(45) Date of Patent: Jun. 15, 2021

(54) UPLINK CONTROL INFORMATION PIGGYBACKING IN WIRELESS SYSTEMS

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/243,958

(22) Filed: Jan. 9, 2019

(65) Prior Publication Data

US 2019/0223207 A1    Jul. 18, 2019

Related U.S. Application Data

(60) Provisional application No. 62/617,045, filed on Jan. 12, 2018.

(51) Int. Cl.
*H04W 72/12* (2009.01)
*H04L 5/00* (2006.01)
*H04W 72/14* (2009.01)

(52) U.S. Cl.
CPC ......... *H04W 72/1289* (2013.01); *H04L 5/001* (2013.01); *H04L 5/0053* (2013.01); *H04L 5/0091* (2013.01); *H04W 72/14* (2013.01); *H04W 72/1278* (2013.01)

(58) Field of Classification Search
CPC .......................... H04L 72/1289; H04W 72/14
See application file for complete search history.

(56) References Cited

U.S. PATENT DOCUMENTS

2013/0028205 A1* 1/2013 Damnjanovic ......... H04L 5/001
370/329
2013/0083766 A1* 4/2013 Chung .............. H04W 72/0413
370/329
2016/0323875 A1 11/2016 Noh et al.

FOREIGN PATENT DOCUMENTS

EP          2579667 A1    4/2013

OTHER PUBLICATIONS

International Search Report and Written Opinion—PCT/US2019/012980—ISA/EPO—Apr. 24, 2019.

* cited by examiner

*Primary Examiner* — Jamal Javaid

(57) ABSTRACT

Methods, systems, and devices for wireless communications are described. A user equipment (UE) may receive a downlink control message from a base station. The downlink control message may include a grant for communication with the base station and an indication of a component carrier (CC) to use for transmission of uplink control information (UCI). The UE may determine a CC for UCI transmission based at least in part on the CC indication, and the UE may transmit an uplink message including the UCI via the determined CC.

25 Claims, 14 Drawing Sheets

UPLINK CONTROL INFORMATION PIGGYBACKING IN WIRELESS SYSTEMS

CROSS REFERENCES

The present Application for patent claims the benefit of U.S. Provisional Patent Application No. 62/617,045 by Huang et al., entitled "UPLINK CONTROL INFORMATION PIGGYBACKING IN WIRELESS SYSTEMS," filed Jan. 12, 2018, assigned to the assignee hereof, and expressly incorporated by reference herein.

BACKGROUND

The following relates generally to wireless communication, and more specifically to uplink control information (UCI) piggybacking in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may communicate UCI to a base station that may include information such as feedback information (e.g., hybrid automatic repeat request (HARD) Acknowledgement/Negative Acknowledgement (ACK/NACK) information), channel state information (CSI), a scheduling request (SR), a buffer status report (BSR), or any other control information. When carrier aggregation is utilized, a UE may select a specific component carrier (CC) on which to transmit UCI. In some cases, the carrier to be used by the UE is based on an uplink grant transmitted from a base station to the UE (e.g., an uplink grant containing an aperiodic CSI trigger). In these instances, a base station expects to receive the UCI on a specific CC. However, if the uplink grant is not successfully received or decoded by the UE, the UE may not transmit the UCI on the expected CC.

SUMMARY

The described techniques relate to improved methods, systems, devices, or apparatuses that support uplink control information (UCI) piggybacking on shared channels in wireless systems. A user equipment (UE) in a wireless system that supports carrier aggregation may receive a downlink control message from a base station. The downlink control message may include a grant for an uplink shared channel (e.g., a physical uplink shared channel (PUSCH)) and also may include an indication of a component carrier (CC) for transmission of UCI. In some cases, the CC scheduled for the uplink shared channel is the CC indicated by grant and the UE may determine to piggyback the UCI with the shared channel transmission in a single payload. In other cases, the CC scheduled for the uplink shared channel is not the CC indicated by grant and the UE may then piggyback the UCI with a primary CC (PCC) or a secondary CC (SCC) used for uplink transmission. The UE may therefore be capable of transmitting UCI over resources expected by the base station even if the UE fails to decode one or more downlink control messages from the base station.

A method of wireless communication is described. The method may include receiving, from a base station, a downlink control message that may include a grant for communication with the base station and an indication of which CC to use for transmission of UCI on a shared channel, determining a CC for transmission of the UCI on the shared channel based at least in part on the indication received in the downlink control message, and transmitting, to the base station, an uplink message that may include the UCI via the determined CC.

An apparatus for wireless communication is described. The apparatus may include means for receiving, from a base station, a downlink control message that may include a grant for communication with the base station and an indication of which CC to use for transmission of UCI on a shared channel, means for determining a CC for transmission of the UCI on the shared channel based at least in part on the indication received in the downlink control message, and means for transmitting, to the base station, an uplink message that may include the UCI via the determined CC.

Another apparatus for wireless communication is described. The apparatus may include a processor, memory in electronic communication with the processor, and instructions stored in the memory. The instructions may be operable to cause the processor to receive, from a base station, a downlink control message that may include a grant for communication with the base station and an indication of which CC to use for transmission of UCI on a shared channel, determine a CC for transmission of the UCI on the shared channel based at least in part on the indication received in the downlink control message, and transmit, to the base station, an uplink message that may include the UCI via the determined CC.

A non-transitory computer-readable medium for wireless communication is described. The non-transitory computer-readable medium may include instructions operable to cause a processor to receive, from a base station, a downlink control message that may include a grant for communication with the base station and an indication of which CC to use for transmission of UCI on a shared channel, determine a CC for transmission of the UCI on the shared channel based at least in part on the indication received in the downlink control message, and transmit, to the base station, an uplink message that may include the UCI via the determined CC.

In some examples of the method, apparatus, and non-transitory computer-readable medium described herein, the downlink control message may include scheduling information for an uplink shared channel transmission on a first CC, where the indication received in the downlink control message indicates the first CC.

Some examples of the method, apparatus, and non-transitory computer-readable medium described herein may further include processes, features, means, or instructions for multiplexing the uplink shared channel transmission and the UCI, where the uplink message may include a physical uplink shared channel payload including the multiplexed uplink shared channel transmission and the UCI.

In some examples of the method, apparatus, and non-transitory computer-readable medium described herein, transmitting the uplink message may include transmitting the uplink message via the first CC.

In some examples of the method, apparatus, and non-transitory computer-readable medium described herein, the downlink control message may include scheduling information for an uplink shared channel transmission on a first CC, where the indication received in the downlink control message indicates a second CC different from the first CC.

Some examples of the method, apparatus, and non-transitory computer-readable medium described herein may further include processes, features, means, or instructions for determining that the UE may be configured for simultaneous control channel and shared channel transmissions. Some examples of the method, apparatus, and non-transitory computer-readable medium described herein may further include processes, features, means, or instructions for identifying a set of uplink control channel resources configured for the second CC, where the uplink message may be transmitted via the second CC using the set of uplink control channel resources.

Some examples of the method, apparatus, and non-transitory computer-readable medium described herein may further include processes, features, means, or instructions for determining that the UE may be configured for simultaneous control channel and shared channel transmissions. Some examples of the method, apparatus, and non-transitory computer-readable medium described herein may further include processes, features, means, or instructions for determining that a set of uplink control channel resources may be not configured for the second CC, where the uplink message may be transmitted based at least in part on the determination that the set of uplink control channel resources may be not configured for the second CC.

In some examples of the method, apparatus, and non-transitory computer-readable medium described herein, transmitting the uplink message may include transmitting the uplink message via an uplink PCC based at least in part on a shared channel transmission scheduled on the uplink PCC.

In some examples of the method, apparatus, and non-transitory computer-readable medium described herein, transmitting the uplink message may include transmitting the uplink message via an SCC that may have a shared channel transmission scheduled.

In some examples of the method, apparatus, and non-transitory computer-readable medium described herein, the SCC may be associated with a lowest carrier index of a set of carrier indices corresponding to available SCCs.

Some examples of the method, apparatus, and non-transitory computer-readable medium described herein may further include processes, features, means, or instructions for determining that the UE may be not configured for simultaneous control channel and shared channel transmissions, where the uplink message may be transmitted based at least in part on the determination that the UE may be not configured for simultaneous control channel and shared channel transmissions.

In some examples of the method, apparatus, and non-transitory computer-readable medium described herein, transmitting the uplink message may include transmitting the uplink message via an uplink PCC based at least in part on a shared channel transmission scheduled on the uplink PCC.

In some examples of the method, apparatus, and non-transitory computer-readable medium described herein, transmitting the uplink message may include transmitting the uplink message via an SCC that may have a shared channel transmission scheduled.

In some examples of the method, apparatus, and non-transitory computer-readable medium described herein, the SCC may be associated with a lowest carrier index of a set of carrier indices corresponding to available SCCs.

Some examples of the method, apparatus, and non-transitory computer-readable medium described herein may further include processes, features, means, or instructions for determining a simultaneous control channel and shared channel configuration for the UE, where the uplink message may be transmitted based at least in part on the simultaneous control channel and shared channel configuration.

Some examples of the method, apparatus, and non-transitory computer-readable medium described herein may further include processes, features, means, or instructions for receiving scheduling information for a downlink shared channel transmission from the base station. Some examples of the method, apparatus, and non-transitory computer-readable medium described herein may further include processes, features, means, or instructions for decoding the downlink shared channel transmission based at least in part on the scheduling information. Some examples of the method, apparatus, and non-transitory computer-readable medium described herein may further include processes, features, means, or instructions for determining feedback information for the downlink shared channel transmission based at least in part on the decoding, where the UCI may include the feedback information.

In some examples of the method, apparatus, and non-transitory computer-readable medium described herein, transmitting the uplink message may include transmitting the UCI that may include the feedback information via an uplink CC associated with an uplink shared channel transmission, where the indication received in the downlink control message indicates the uplink CC.

In some examples of the method, apparatus, and non-transitory computer-readable medium described herein, the grant for communication with the base station includes one of an uplink grant or a downlink grant.

A method of wireless communication is described. The method may include identifying a CC to be used by a UE for transmission of UCI on a shared channel, generating a grant for communication with a base station, the grant including an indication of the identified CC, and transmitting, to the UE, a downlink control message that includes the grant.

An apparatus for wireless communication is described. The apparatus may include means for identifying a CC to be used by a UE for transmission of UCI on a shared channel, means for generating a grant for communication with a base station, the grant including an indication of the identified CC, and means for transmitting, to the UE, a downlink control message that includes the grant.

Another apparatus for wireless communication is described. The apparatus may include a processor, memory in electronic communication with the processor, and instructions stored in the memory. The instructions may be operable to cause the processor to identify a CC to be used by a UE for transmission of UCI on a shared channel, generate a grant for communication with a base station, the grant including an indication of the identified CC, and transmit, to the UE, a downlink control message that includes the grant.

A non-transitory computer-readable medium for wireless communication is described. The non-transitory computer-readable medium may include instructions operable to cause a processor to identify a CC to be used by a UE for transmission of UCI on a shared channel, generate a grant for communication with a base station, the grant including an indication of the identified CC, and transmit, to the UE, a downlink control message that includes the grant.

Some examples of the method, apparatus, and non-transitory computer-readable medium described herein may further include processes, features, means, or instructions for receiving, from the UE, UCI via the identified CC based at least in part on the grant.

Some examples of the method, apparatus, and non-transitory computer-readable medium described herein may further include processes, features, means, or instructions for receiving, from the UE, UCI via a PCC or an SCC associated with an uplink shared channel transmission.

Some examples of the method, apparatus, and non-transitory computer-readable medium described herein may further include processes, features, means, or instructions for receiving, from the UE, UCI via an SCC associated with a lowest carrier index of a set of carrier indices corresponding to available SCCs.

In some examples of the method, apparatus, and non-transitory computer-readable medium described herein, generating the grant may include jointly encoding downlink control information and the indication of the identified CC.

In some examples of the method, apparatus, and non-transitory computer-readable medium described herein, the indication of the identified CC indicates a CC index for transmission of the UCI. In some examples of the method, apparatus, and non-transitory computer-readable medium described herein, the grant may include a field that signals the CC index.

In some examples of the method, apparatus, and non-transitory computer-readable medium described herein, the grant for communication with the base station may include one of an uplink grant or a downlink grant.

DETAILED DESCRIPTION

Techniques of the present disclosure include piggybacking uplink control information (UCI) onto a shared channel (e.g., a physical uplink shared channel (PUSCH)) in carrier aggregation. In some wireless systems, a UE may select a component carrier (CC) on which to transmit UCI based on a shared channel location. For example, a system that implements aperiodic channel state information (CSI) triggering may select the uplink CC corresponding to the downlink CC over which the CSI trigger was transmitted. In another example, a system that does not implement aperiodic CSI triggering may instead rely on the location of a PUSCH in relation to the associated carrier index value. If the PUSCH is carried over a primary CC (PCC), then the UE will select the PCC for transmission of UCI. If the PCC is not configured for PUSCH, then the UE may transmit UCI over a secondary CC (SCC) that has scheduled transmissions and that has the lowest carrier index value.

In these implementations, a UE may incorrectly detect or unsuccessfully receive an uplink grant for scheduling uplink transmissions. If misdetection occurs, the UE may transmit UCI over resources where the base station may not be anticipating UCI, or the UE may refrain from UCI completely. According to some aspects, an indication of the CC for transmission of UCI may be included in an uplink grant or downlink grant transmitted by a base station. This may allow the UE to determine a CC for UCI piggybacking even if the UE fails to receive every uplink grant or downlink grant transmitted to the UE. In one example, the UE may receive a downlink control message which includes a grant for uplink transmissions as well as an indication of a CC to use for transmitting UCI. The UE may determine a CC to be used for transmitting the UCI based on the CC indication, and may transmit the UCI over the determined CC.

Aspects of the disclosure are initially described in the context of wireless communications systems. Aspects are also described with reference to process flows. Aspects of the disclosure are further illustrated by and described with reference to apparatus diagrams, system diagrams, and flowcharts that relate to UCI piggybacking on shared channels.

Figure 1:
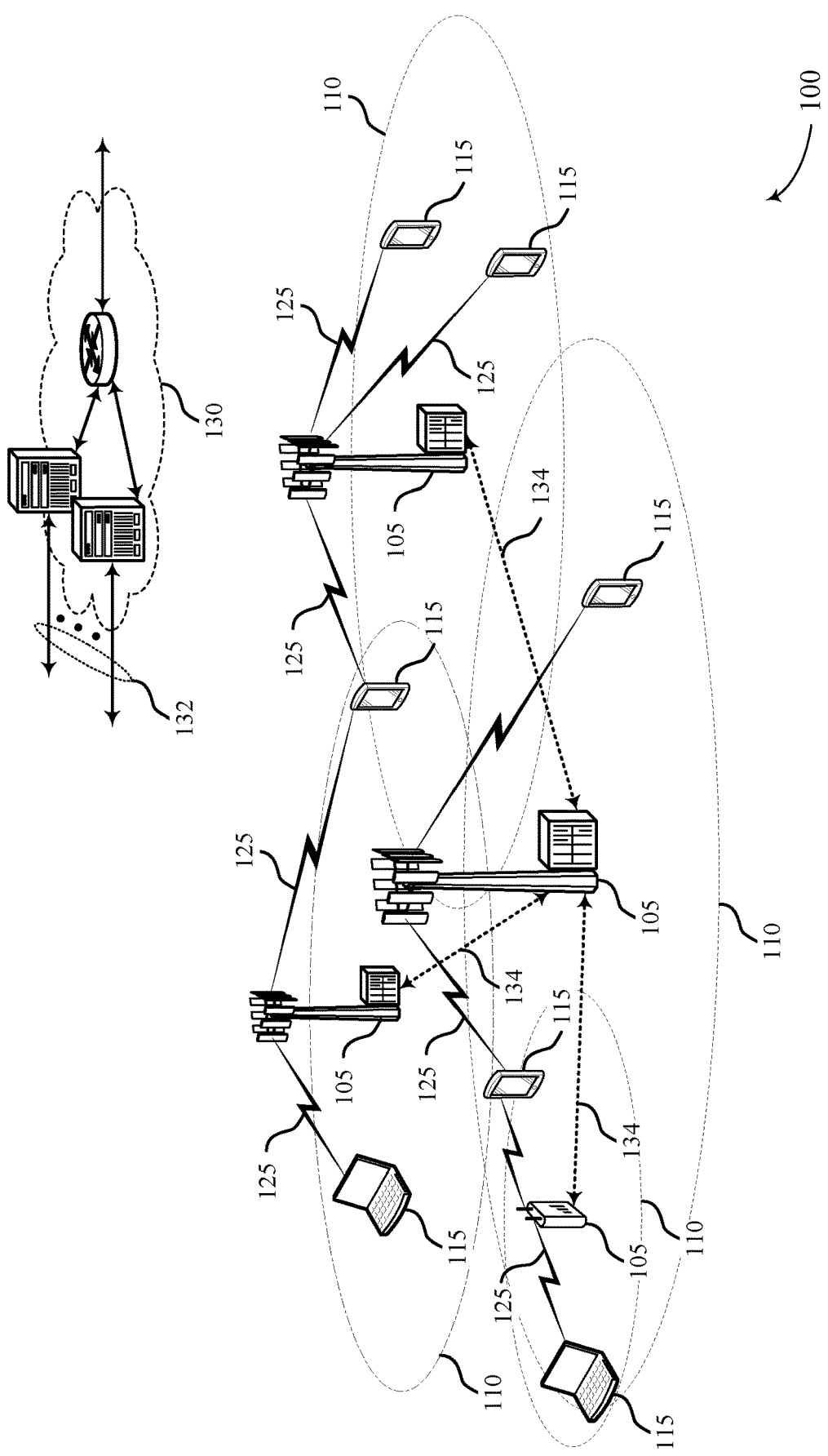
FIG. 1 illustrates an example of a wireless communications system that supports uplink control information (UCI) piggybacking in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system, which may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, the wireless communications system 100 may allow for inclusion of a UCI carrier index value indicative of a CC for UCI transmission from a UE 115. A base station 105 may transmit a UCI carrier index value (or other indication of a CC for UCI) in multiple uplink grants transmitted to the UE 115. This may allow for a UE to determine resources to use for UCI transmission even if the UE 115 fails to decode one or more grants from the base station 105.

The UE 115 may determine a CC for UCI transmission based on a received downlink control message, which may include a grant that indicates a CC for UCI piggybacking. In some cases, the UE 115 may also determine whether the UE 115 is configured for simultaneous uplink control transmissions and uplink shared transmissions and may determine the CC for UCI piggybacking based on the simultaneous uplink control transmissions and uplink shared transmissions configuration. In some examples, the UE 115 may also determine the CC for UCI piggybacking based on whether resources are scheduled for transmission over a shared channel.

Figure 2:
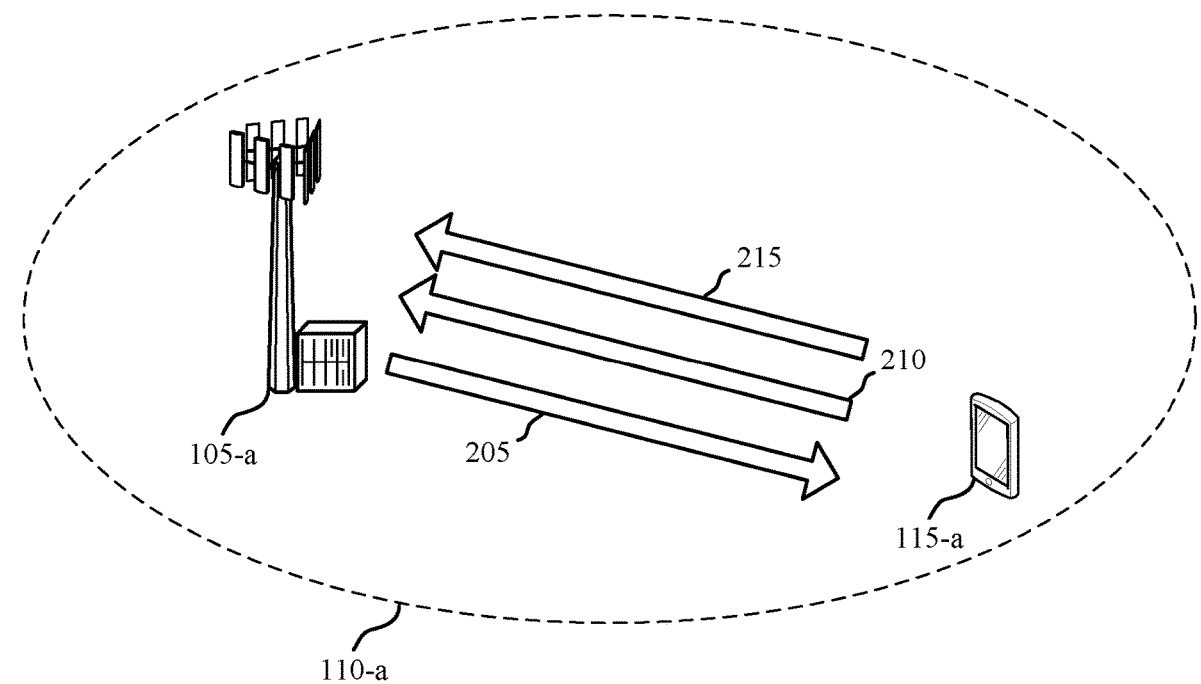
FIG. 2 illustrates an example of a wireless communications system that supports UCI piggybacking in accordance with aspects of the present disclosure.

FIG. 2 illustrates an example of a wireless communications system 200 that supports UCI piggybacking in wireless systems in accordance with various aspects of the present disclosure. In some examples, the wireless communications system 200 may implement aspects of wireless communications system 100. Base station 105-*a* may be an example of a base station 105 described with reference to FIG. 1, while a UE 115-*a* may be an example of a UE 115 described with reference to FIG. 1.

Wireless communications system 200 may support CA, which may allow for multiple CCs to be used by the base station 105-*a*, the UE 115-*a*, or both, to transmit information over multiple channels. For example, the base station 105-*a* may transmit downlink control messages, such as uplink or downlink grants, over a downlink CC 205 to the UE 115-*a*. Based on information received in these downlink control messages, the UE 115-*a* may transmit one or more PUSCH transmissions over a first uplink CC 210, a second uplink CC 215, or both. Each CC may include dedicated frequency resources of a frequency spectrum for wireless communication.

In systems that support CA, such as wireless communications system 200, there may be multiple techniques for determining the CCs for transmission of UCI (e.g., CSI, SRs, feedback information). One technique may rely on the CC location of a PUSCH. In this technique, if there is a PUSCH located on the uplink PCC, then the UCI may be mapped onto the uplink PCC. However, if there is no PUSCH located on the uplink PCC, then the UCI may be mapped onto an uplink SCC that has the smallest carrier index value (e.g., SCellIndex-r10) scheduled for transmission in an uplink grant. Another technique may allow for aperiodic CSI triggering to indicate the CC(s) to use for UCI transmission. In this technique, UCI may be mapped onto a PUSCH of a CC indicated by the uplink grant containing the aperiodic CSI trigger. A UE may receive one positive aperiodic CSI trigger for a given subframe.

UCI may be transmitted by UE 115-*a* over a PUSCH or a physical uplink control channel (PUCCH) via one or more CCs (e.g., first uplink CC 210 or second uplink CC 215). In some cases, UCI may be piggybacked (e.g., transmitted concurrently, multiplexed, jointly encoded) with a shared channel transmission (e.g., a PUSCH). In such cases, the shared channel transmission and the UCI may be contained within a single payload.

In some cases, the UE may incorrectly detect an uplink grant for the UE 115-*a*. If misdetection occurs, there may be misalignment between the base station 105-*a* and UE 115-*a* regarding which CCs to use for UCI transmission.

According to some aspects, the base station 105-*a* may add a field signaling the CC index for UCI transmission in each grant for UE 115-*a*. Additionally or alternatively, the base station 105-*a* may jointly encode CC index signaling with other parameters in an uplink grant (e.g., downlink control information (DCI)), where the CC index signaling may indicate the CCs for UCI transmission.

If the UE 115-*a* fails to decode an uplink grant, the UE 115-*a* may refrain from transmitting UCI over PUSCH and instead may transmit UCI over a PUCCH. However, if at least one uplink grant is decoded, then the UE 115-*a* may determine which CC to use for UCI transmission. If the decoded uplink grant schedules a transmission over a PUSCH on a CC (e.g., the first uplink carrier 210), the UE 115-*a* may then transmit UCI on the scheduled CC. If the decoded uplink grant fails to schedule a transmission over a PUSCH on a CC, the UE 115-*a* may select a CC based on a channel configuration of UE 115-*a*. If the UE 115-*a* is not configured for simultaneous transmissions over PUCCH and PUSCH, or if simultaneous PUCCH and PUSCH transmissions are configured but there is no PUCCH resource available on the CC scheduled in the decoded uplink grant, then the UE 115-*a* may transmit UCI via the a CSI trigger location, a PUSCH carrier location, or on the scheduled CC with the smallest CC index value. The UE configuration may be based on the capabilities of the UE 115-*a*, the base station, or both, and may be indicated during a capability transfer procedure. If the UE 115-*a* is configured for simultaneous PUCCH and PUSCH transmission, and PUCCH resources are configured on a CC scheduled for transmission in the decoded uplink grant, the UE 115-*a* may transmit UCI over the PUCCH on the indicated CC.

Alternatively, the base station 105-*a* may indicate CCs for UCI transmission in downlink grants. A downlink grant which schedules a physical downlink shared channel (PDSCH) may also indicate the CCs to use for a UCI transmission. In each downlink grant, the base station 105-*a* may add a field signaling the CC index for UCI transmission. Additionally or alternatively, the base station 105-*a* may jointly encode CC index signaling with other parameters in a downlink grant.

Figure 3:
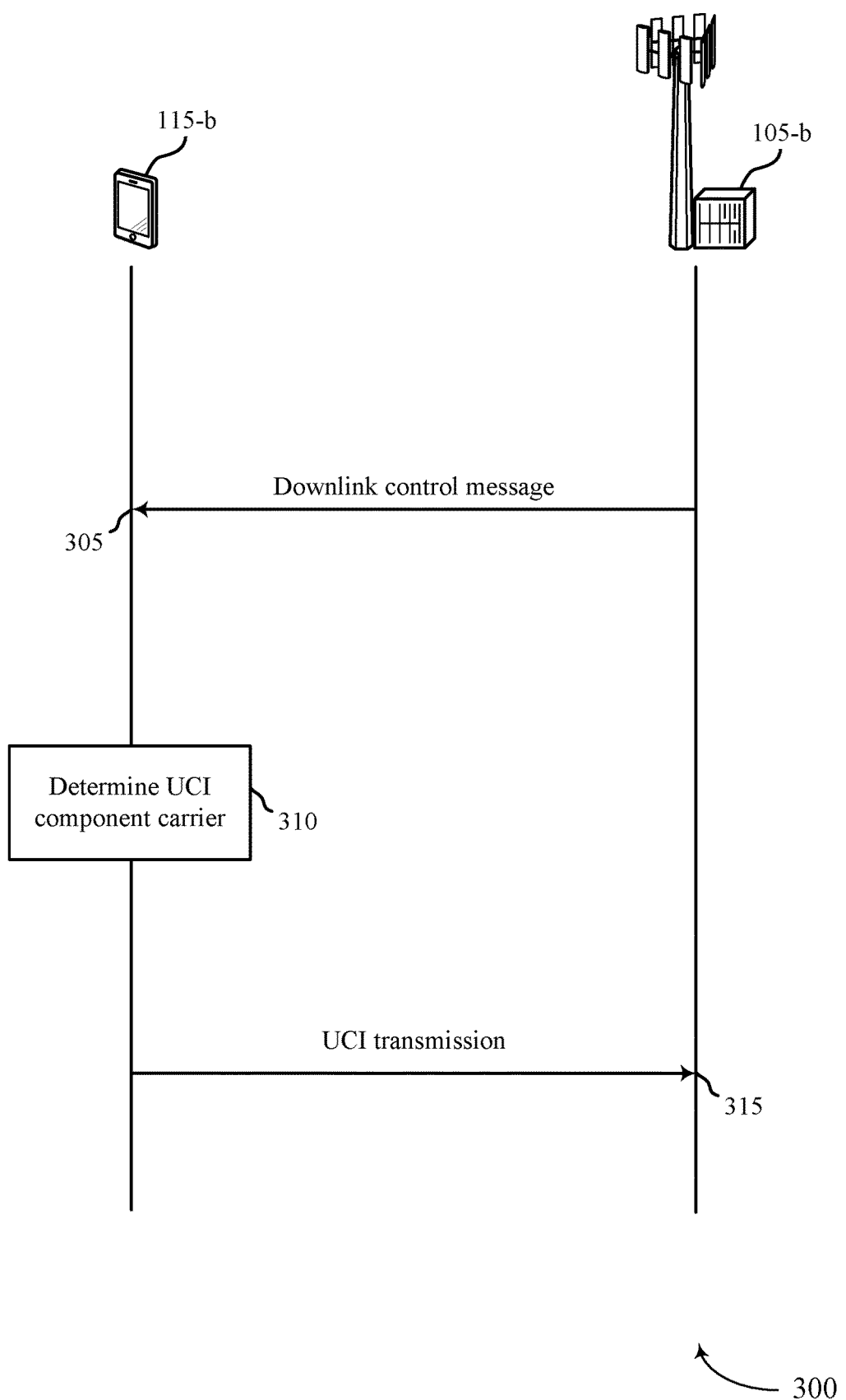
FIG. 3 illustrates an example of a process flow that supports UCI piggybacking in wireless systems in accordance with aspects of the present disclosure.

FIG. 3 illustrates an example of a process flow 300 that supports UCI piggybacking in wireless systems in accordance with various aspects of the present disclosure. In some examples, process flow 300 may implement aspects of wireless communications systems 100 or 200. The process flow 300 may include a UE 115-*b* and a base station 105-*b*, which may be examples of the corresponding devices described with reference to FIGS. 1 and 2.

At 305, the UE 115-*b* may receive a downlink control message from the base station. The downlink control message may include a grant for scheduling communications over a shared channel (e.g., a PUSCH). The downlink control message may also include an indication of a CC for the UE to use for UCI transmission to the base station. For example, the downlink control message may include a CC index value, where the CC index value may indicate which CC of a set of CCs to use for UCI transmissions. Further, the grant for scheduling communications may be generated at a base station 105-*b*. The grant may be generated based on identifying a CC to be used for UCI transmission over a shared channel.

At 310, the UE 115-*b* may determine a CC to transmit UCI based on the indication of the CC in the downlink control message received at 305. If the CC scheduled for uplink transmissions in the downlink control message matches the CC indicated in the downlink control message to UCI transmissions, the UE may select the scheduled CC to transmit UCI.

Alternatively, if the CC scheduled for uplink transmissions in the downlink control message fails to match the CC indicated in the downlink control message for UCI transmissions, the UE 115-*b* may then select a CC to carry UCI based on a UE channel configuration. For example, the UE 115-*b* may determine that the UE 115-*b* is not configured for simultaneous control channel (e.g., PUCCH) transmissions and shared channel transmissions. The determination may be based on system information received by the base station 105-*b*, or the system information may be stored by the UE 115-*b*. Additionally, the UE 115-*b* may determine that the CC scheduled for uplink transmissions is not configured for control channel transmissions (e.g., a PUCCH is available on scheduled CC). In this case, the UE 115-*b* may select a CC for UCI transmission based on one of: a shared channel located on a CC indicated by an uplink grant containing aperiodic CSI trigger, a PUSCH located on the uplink PCC of the cell, or an SCC that has the smallest carrier index value (e.g., SCellIndex-r10) scheduled for transmission in an uplink grant.

Alternatively, the UE 115-*b* may determine that the CC scheduled for uplink transmissions is configured for control channel transmissions. In this case, the UE 115-*b* may select the scheduled CC to transmit UCI over.

In another case, the UE 115-*b* may determine that the UE 115-*b* is not configured for simultaneous control channel and shared channel transmissions. In this case, the UE 115-*b* may select a CC for UCI transmission based on one of: a shared channel located on a CC indicated by an uplink grant containing aperiodic CSI trigger, a PUSCH located on the uplink PCC of the cell, or an SCC that has the smallest carrier index value for transmission in an uplink grant.

At 315, the UE 115-*b* may transmit an uplink message including the UCI over the determined CC to the base station 105-*b*. Additionally, transmitting may include multiplexing shared channel transmissions and the UCI.

Figure 4:
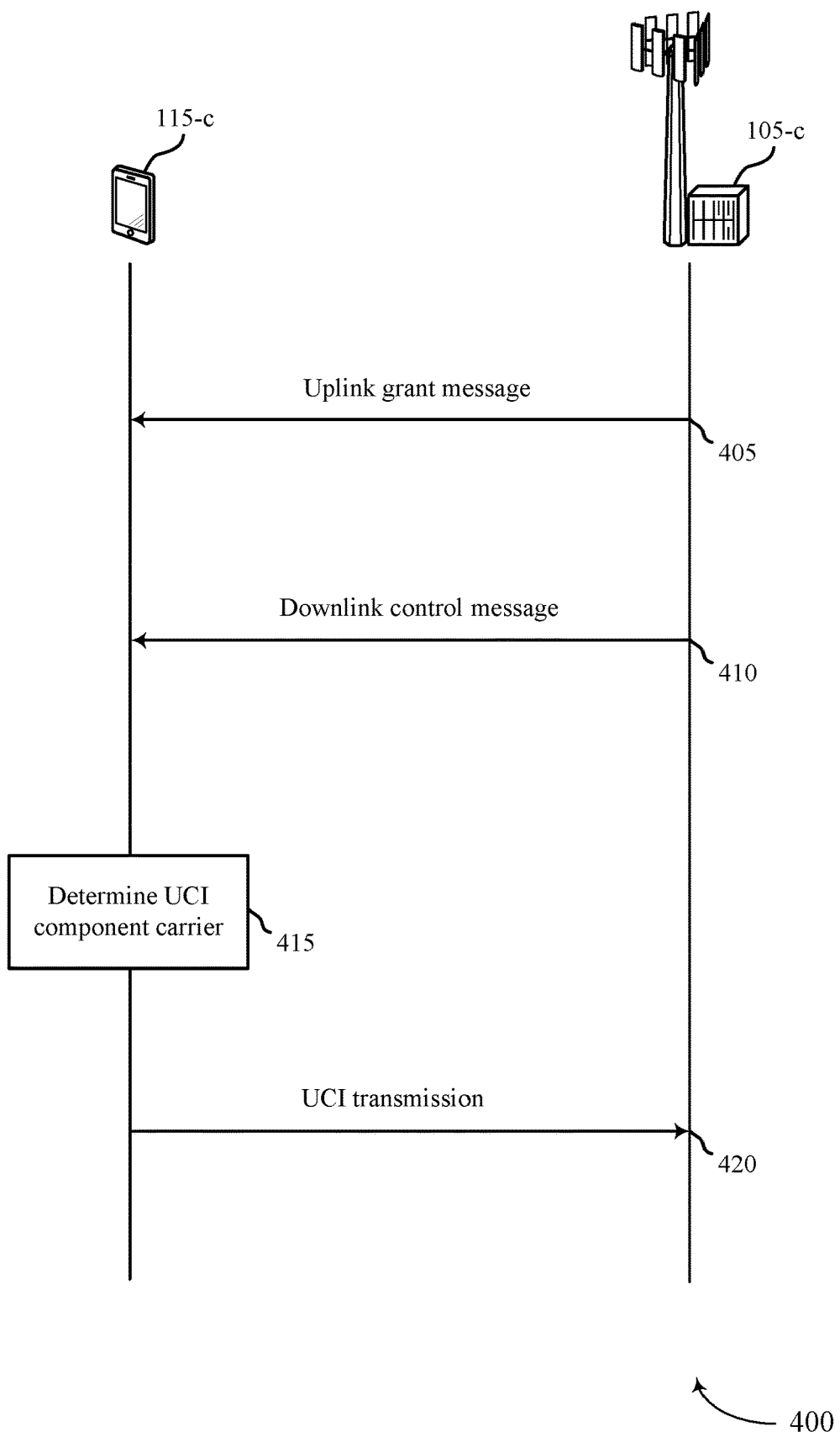
FIG. 4 illustrates an example of a process flow that supports UCI piggybacking in wireless systems in accordance with aspects of the present disclosure.

FIG. 4 illustrates an example of a process flow 400 that supports UCI piggybacking in wireless systems in accordance with various aspects of the present disclosure. In some examples, the process flow 400 may implement aspects of wireless communications system 100. The process flow 400 may include a UE 115-*c* and a base station 105-*c*. which may be examples of the corresponding devices described with reference to FIGS. 1-3.

At 405, the UE 115-*c* may receive an uplink grant from a base station 105-*c*. The uplink grant may include scheduling information for PUSCH transmissions over a CC.

At 410, the UE 115-*c* may receive a downlink control message from the base station 105-*c*. The downlink control message may include a grant for scheduling downlink communications over a shared channel (e.g., PDSCH). Additionally, the downlink control message may also include an indication of a CC to use to transmit UCI to the base station 105-*c*. For example, the downlink control message may also include a CC index value, where the CC index value may indicate which CC of a set of CCs to use for UCI transmissions. Further, the grant for scheduling communications may be generated at a base station 105-*c*. The grant may be generated based on identifying a CC to be used for UCI transmission over a shared channel.

At 415, the UE 115-*c* may determine an uplink CC to carry UCI based on the CC indication. If the CC scheduled for uplink transmissions in the downlink control message matches the CC indicated in the downlink control message to UCI transmissions, the UE 115-*c* may select the scheduled CC to transmit UCI.

Alternatively, if the CC scheduled for uplink transmissions in the downlink control message fails to match the CC indicated in the downlink control message for UCI transmissions, the UE 115-*c* may then select a CC to carry UCI based on a UE 115-*c* channel configuration.

The UE 115-*c* may determine that the UE 115-*c* is not configured for simultaneous control channel (e.g., PUCCH) transmissions and shared channel transmissions. The determination may be based on system information received by the base station 105-*c*, or the system information may be stored by the UE 115-*c*. Additionally, the UE 115-*c* may determine that the CC scheduled for uplink transmissions is not configured for control channel transmissions (e.g., A PUCCH is available on scheduled CC). In this case, the UE 115-*c* may select a CC for UCI transmission based on one of: a shared channel located on a CC indicated by an uplink grant containing aperiodic CSI trigger, a PUSCH located on the uplink PCC of the cell, or an SCC that has the smallest carrier index value (e.g., SCellIndex-r10) scheduled for transmission in an uplink grant.

Alternatively, the UE 115-*c* may determine that the CC scheduled for uplink transmissions is configured for control channel transmissions. In this case, the UE 115-*c* may select the scheduled CC to transmit UCI over.

In another case, the UE 115-*c* may determine that the UE 115-*c* is not configured for simultaneous control channel transmissions and shared channel transmissions. In this case, the UE 115-*c* may select a CC for UCI transmission based on one of: a shared channel located on a CC indicated by an uplink grant containing aperiodic CSI trigger, a PUSCH located on the uplink PCC of the cell, or an SCC that has the smallest carrier index value for transmission in an uplink grant.

At 420, the UE 115-*c* may transmit an uplink message including the UCI over the determined CC and to the base station 105-*c*. Additionally, transmitting may include multiplexing shared channel transmissions and the UCI.

Figure 5:
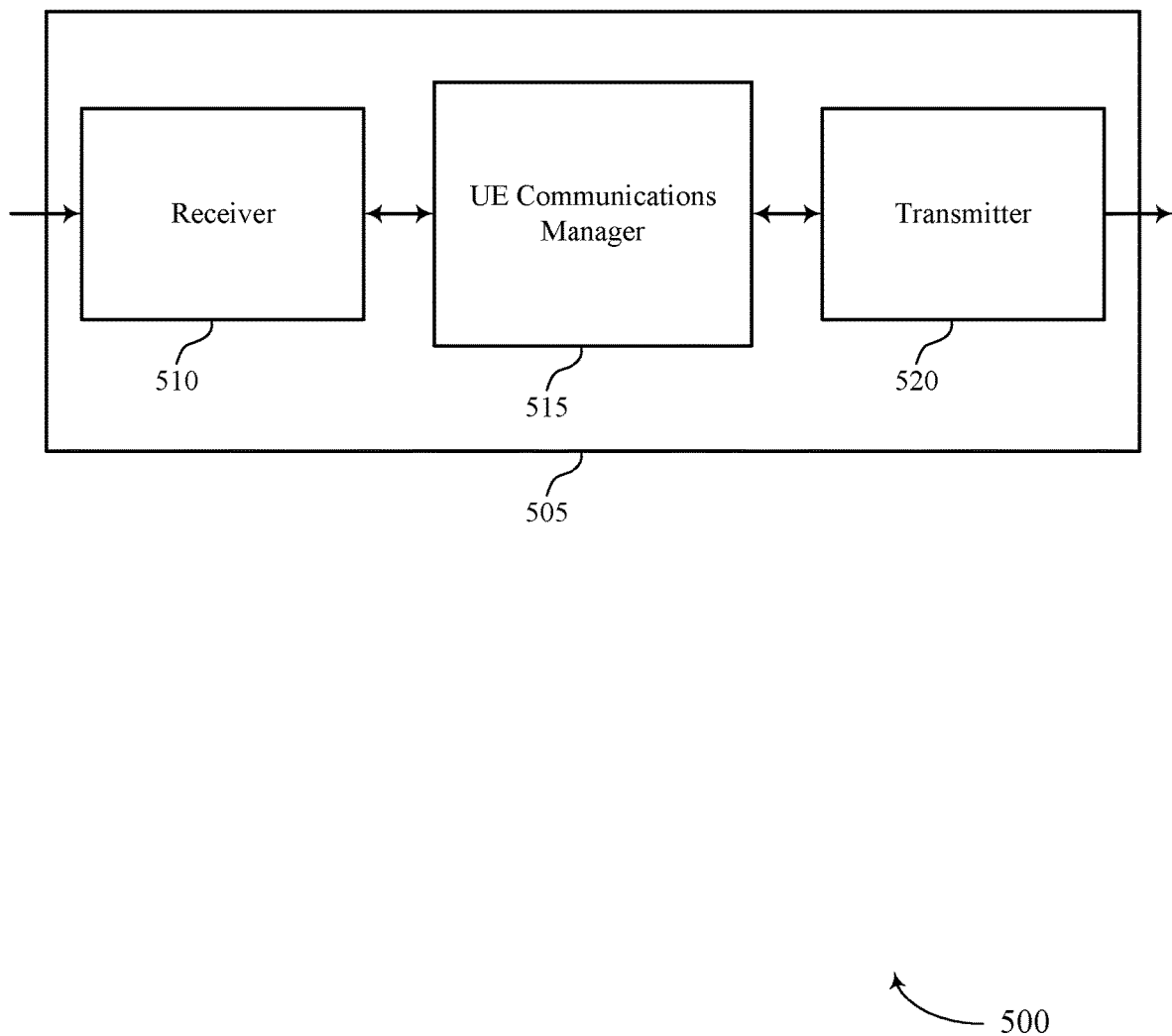
FIGS. 5 through 7 show block diagrams of a device that supports UCI piggybacking in wireless systems in accordance with aspects of the present disclosure.

FIG. 5 shows a block diagram 500 of a wireless device 505 that supports UCI piggybacking in wireless systems in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to UCI piggybacking in wireless systems, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE communications manager 515 may receive, from a base station, a downlink control message that includes a grant for communication with the base station and an indication of which CC to use for transmission of UCI on a shared channel, determine a CC for transmission of the UCI on the shared channel based at least in part on the indication received in the downlink control message, and transmit, to the base station, an uplink message that includes the UCI via the determined CC.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
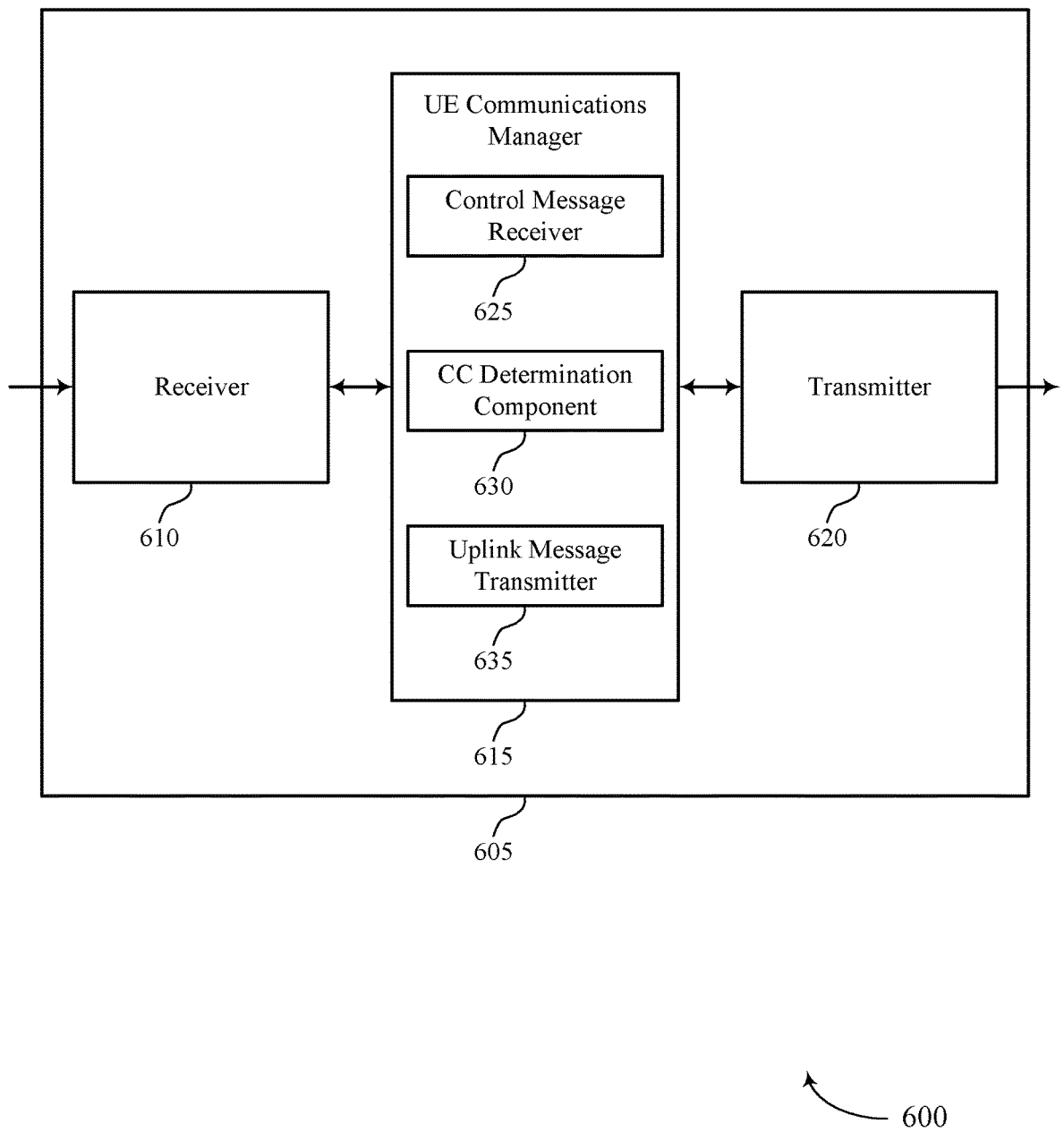

FIG. 6 shows a block diagram 600 of a wireless device 605 that supports UCI piggybacking in wireless systems in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to UCI piggybacking in wireless systems, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include control message receiver 625, CC determination component 630, and uplink message transmitter 635.

Control message receiver 625 may receive, from a base station, a downlink control message that includes a grant for communication with the base station and an indication of which CC to use for transmission of UCI on a shared channel and receive scheduling information for a downlink shared channel transmission from the base station. In some cases, the downlink control message includes scheduling information for an uplink shared channel transmission on a first CC, where the indication received in the downlink control message indicates the first CC. In some cases, the downlink control message includes scheduling information for an uplink shared channel transmission on a first CC, where the indication received in the downlink control message indicates a second CC different from the first CC. In some cases, the grant for communication with the base station includes one of an uplink grant or a downlink grant.

CC determination component 630 may determine a CC for transmission of UCI based on the CC indication.

Uplink message transmitter 635 may transmit, to the base station, an uplink message that includes the UCI via the determined CC. In some cases, transmitting the uplink message includes: transmitting the uplink message via the first CC. In some cases, transmitting the uplink message may include transmitting the uplink message via an uplink PCC based on a shared channel transmission scheduled on the uplink PCC. In some cases, transmitting the uplink message may include transmitting the uplink message via an SCC that has a shared channel transmission scheduled. In some cases, the SCC is associated with a lowest carrier index of a set of carrier indices corresponding to available SCCs. In some cases, transmitting the uplink message may include transmitting the UCI that includes the feedback information via an uplink CC associated with an uplink shared channel transmission, where the indication received in the downlink control message indicates the uplink CC.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
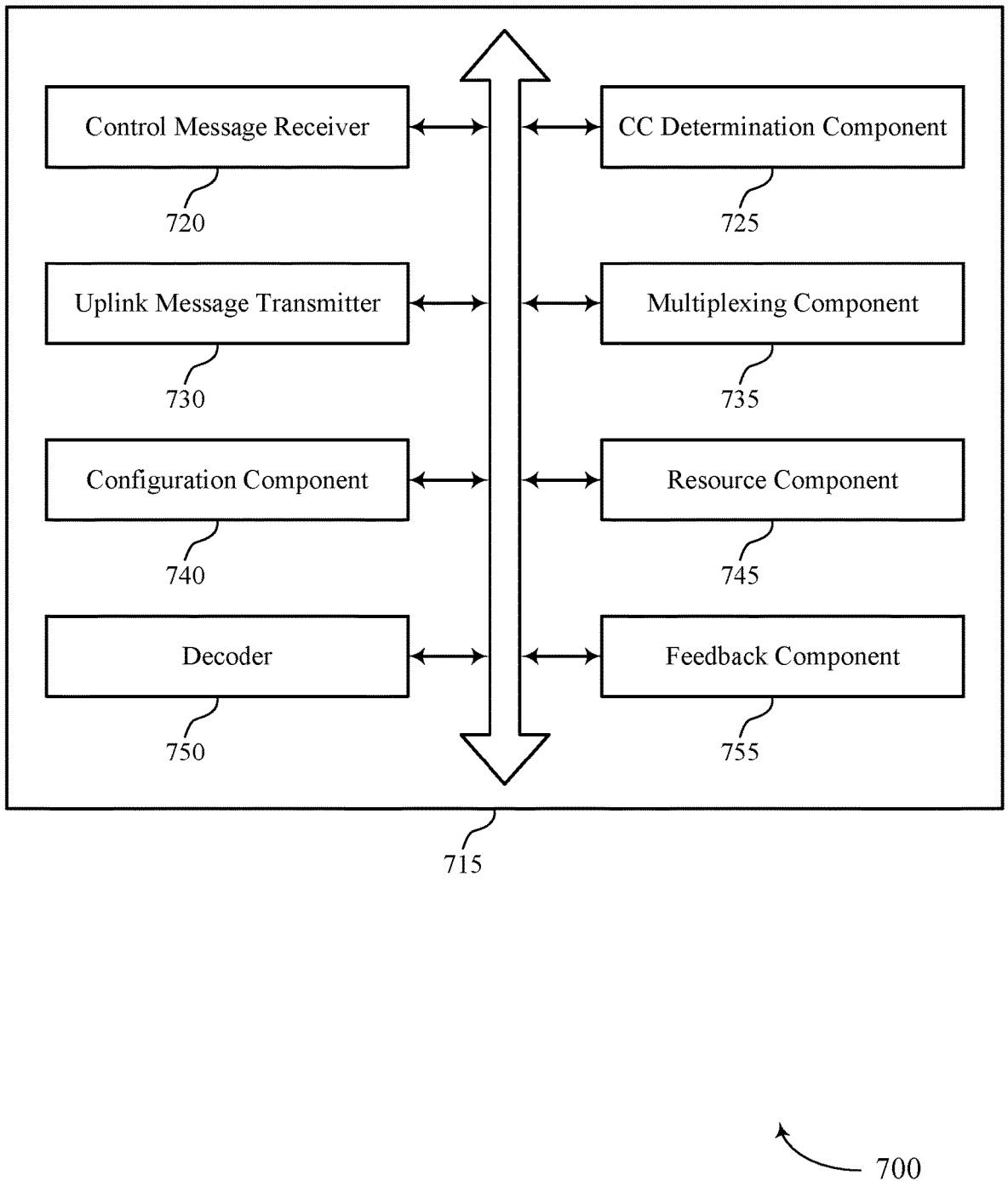

FIG. 7 shows a block diagram 700 of a UE communications manager 715 that supports UCI piggybacking in wireless systems in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include control message receiver 720, CC determination component 725, uplink message transmitter 730, multiplexing component 735, configuration component 740, resource component 745, decoder 750, and feedback component 755. Each of these modules may communicate, directly or indirectly, with one another (e.g., via one or more buses).

Control message receiver 720 may receive, from a base station, a downlink control message that includes a grant for communication with the base station and an indication of which CC to use for transmission of UCI on a shared channel and receive scheduling information for a downlink shared channel transmission from the base station. In some cases, the downlink control message includes scheduling information for an uplink shared channel transmission on a first CC, where the indication received in the downlink control message indicates the first CC. In some cases, the downlink control message includes scheduling information for an uplink shared channel transmission on a first CC, where the indication received in the downlink control message indicates a second CC different from the first CC. In some cases, the grant for communication with the base station includes one of an uplink grant or a downlink grant.

CC determination component 725 may determine a CC for transmission of UCI based on the CC indication.

Uplink message transmitter 730 may transmit, to the base station, an uplink message that includes the UCI via the determined CC. In some cases, transmitting the uplink message includes: transmitting the uplink message via the first CC. In some cases, transmitting the uplink message may include transmitting the uplink message via an uplink PCC based on a shared channel transmission scheduled on the uplink PCC. In some cases, transmitting the uplink message may include transmitting the uplink message via an SCC that has a shared channel transmission scheduled. In some cases, the SCC is associated with a lowest carrier index of a set of carrier indices corresponding to available SCCs. In some cases, transmitting the uplink message may include transmitting the UCI that includes the feedback information via an uplink CC associated with an uplink shared channel transmission, where the indication received in the downlink control message indicates the uplink CC.

Multiplexing component 735 may multiplex the uplink shared channel transmission and the UCI, where the uplink message includes a physical uplink shared channel payload including the multiplexed uplink shared channel transmission and the UCI.

Configuration component 740 may determine that the UE is configured for simultaneous control channel and shared channel transmissions, determine that the UE is not configured for simultaneous control channel and shared channel transmissions, where the uplink message is transmitted based on the determination that the UE is not configured for simultaneous control channel and shared channel transmissions, and determine a simultaneous control channel and shared channel configuration for the UE, where the uplink message is transmitted based on the simultaneous control channel and shared channel configuration.

Resource component 745 may identify a set of uplink control channel resources configured for the second CC, where the uplink message is transmitted via the second CC using the set of uplink control channel resources and determine that a set of uplink control channel resources is not configured for the second CC, where the uplink message is transmitted based on the determination that the set of uplink control channel resources is not configured for the second CC.

Decoder 750 may decode the downlink shared channel transmission based on the scheduling information.

Feedback component 755 may determine feedback information for the downlink shared channel transmission based on the decoding, where the UCI includes the feedback information.

Figure 8:
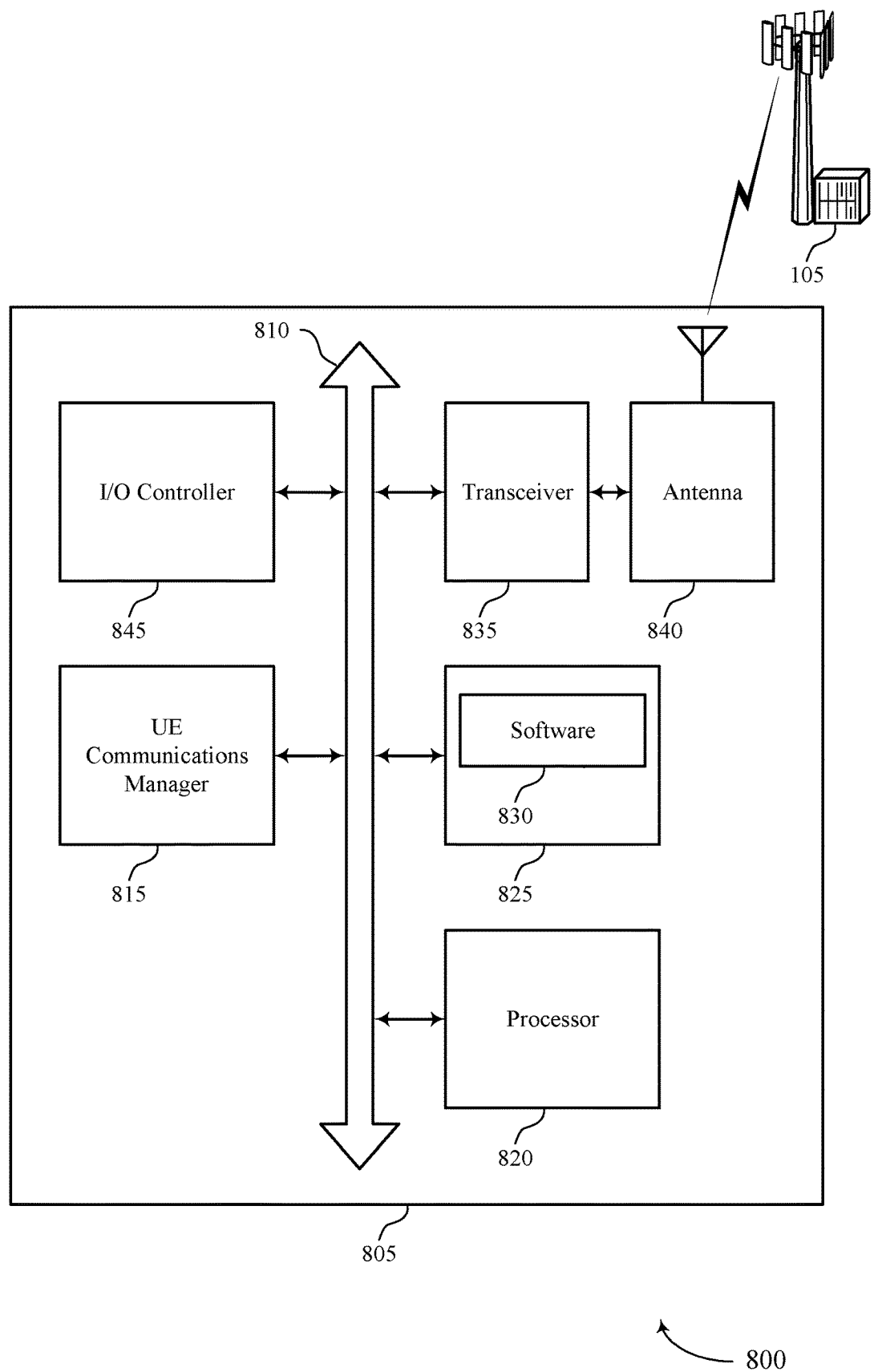
FIG. 8 illustrates a block diagram of a system including a user equipment (UE) that supports UCI piggybacking in accordance with aspects of the present disclosure.

FIG. 8 shows a diagram of a system 800 including a device 805 that supports UCI piggybacking in wireless systems in accordance with aspects of the present disclosure. Device 805 may be an example of or include the components of wireless device 505, wireless device 605, or a UE 115 as described herein, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting UCI piggybacking in wireless systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic I/O system (BIOS) which may control basic hardware or software operation such as the interaction with peripheral components or devices.

Software 830 may include code to implement aspects of the present disclosure, including code to support UCI piggybacking in wireless systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the device 805 may include a single antenna 840, or may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
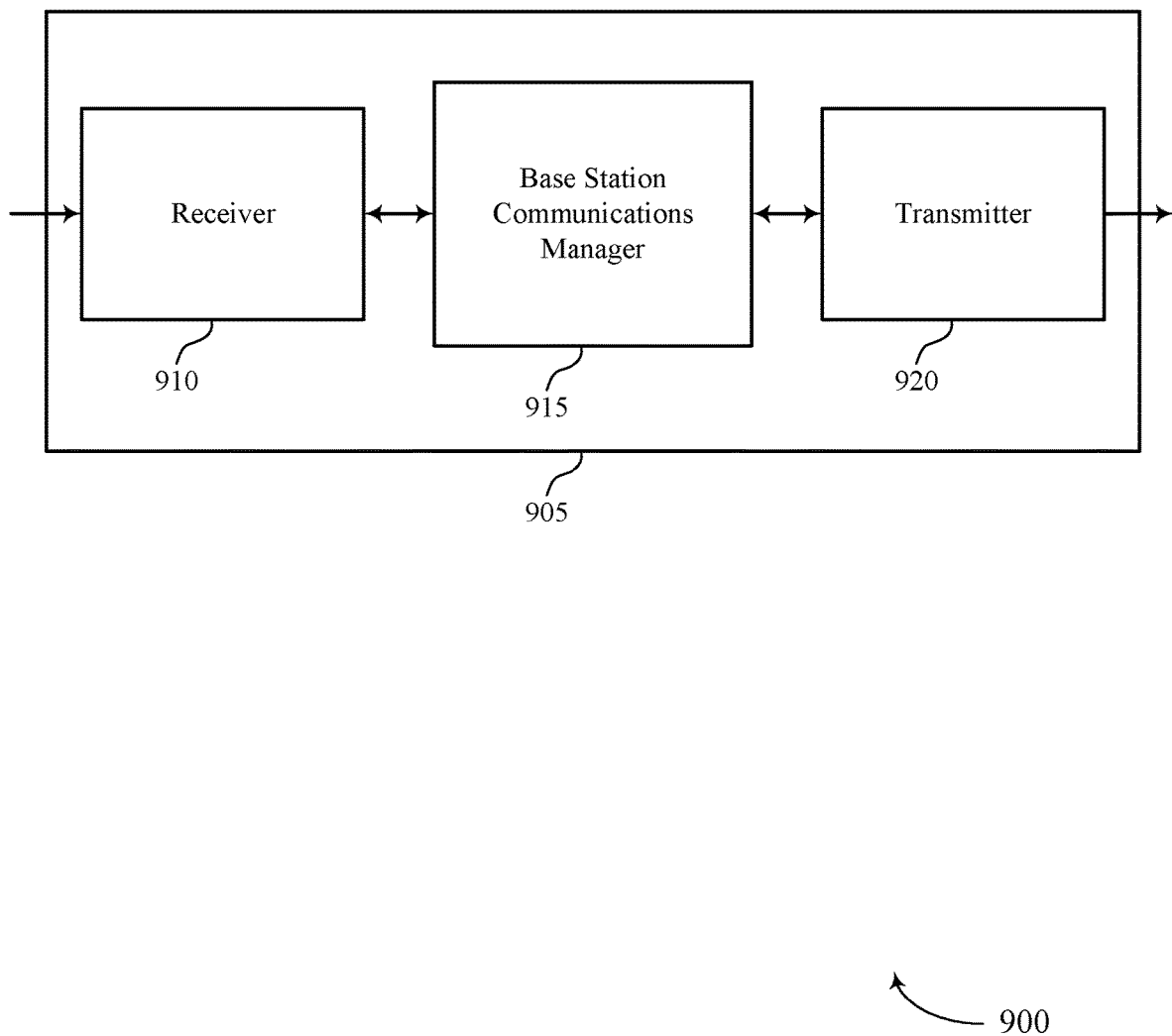
FIGS. 9 through 11 show block diagrams of a device that supports UCI piggybacking in wireless systems in accordance with aspects of the present disclosure.

FIG. 9 shows a block diagram 900 of a wireless device 905 that supports UCI piggybacking in wireless systems in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UCI piggybacking in wireless systems, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a CC to be used by a UE for transmission of UCI on a shared channel, generate a grant for communication with the base station, the grant including an indication of the identified CC, and transmit, to the UE, a downlink control message that includes the grant.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
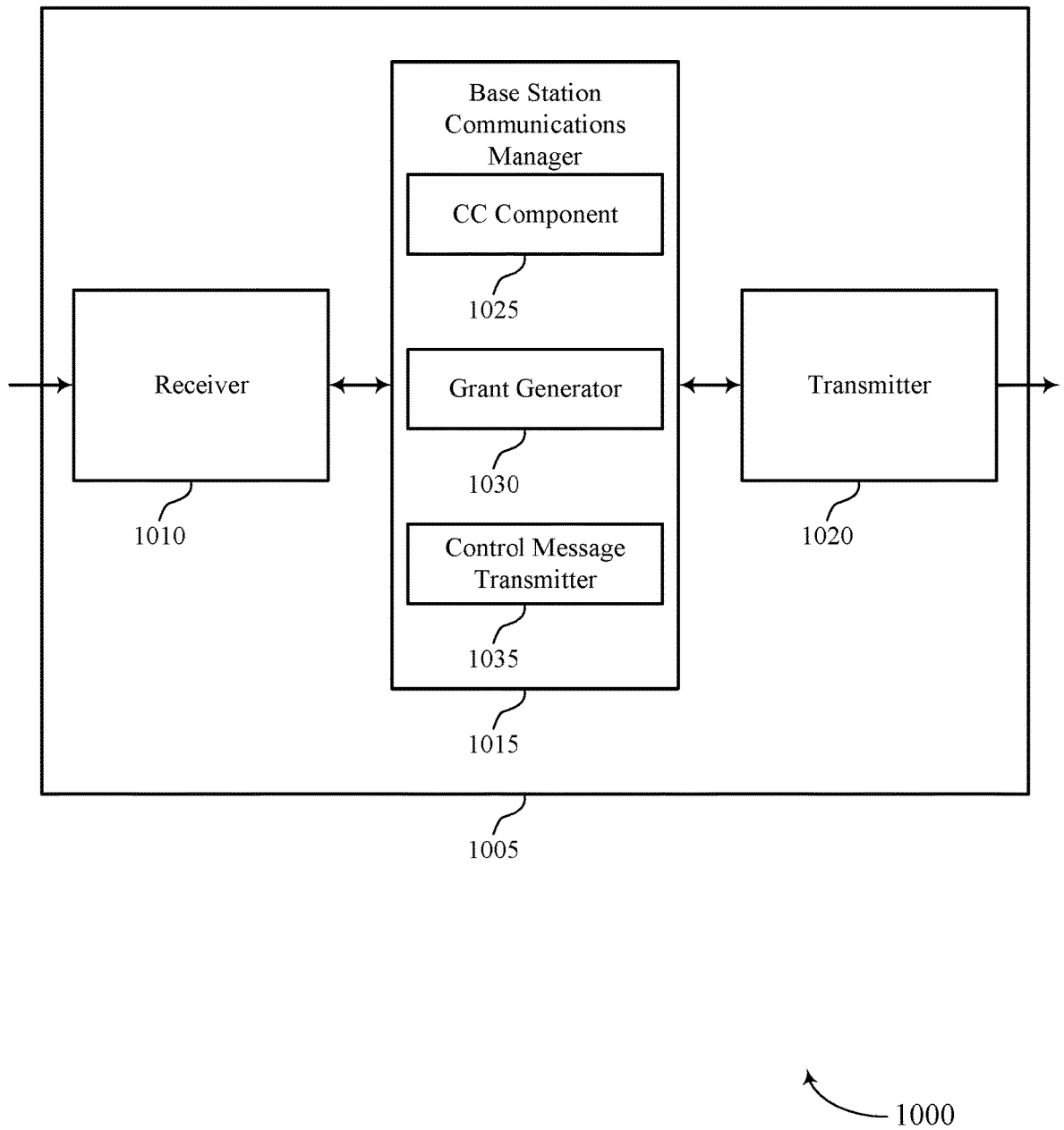

FIG. 10 shows a block diagram 1000 of a wireless device 1005 that supports UCI piggybacking in wireless systems in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to UCI piggybacking in wireless systems, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may include CC component 1025, grant generator 1030, and control message transmitter 1035.

CC component 1025 may identify a CC to be used by a UE for transmission of UCI on a shared channel. In some cases, the CC indication indicates a CC index for transmission of UCI.

Grant generator 1030 may generate a grant for communication with the base station, the grant including an indication of the identified CC. In some cases, generating the grant may include jointly encoding DCI and the indication of the identified CC. In some cases, the grant for communication with the base station includes a field that signals the CC index. In some cases, the grant for communication with the base station includes one of an uplink grant or a downlink grant.

Control message transmitter 1035 may transmit, to the UE, a downlink control message that includes the grant.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
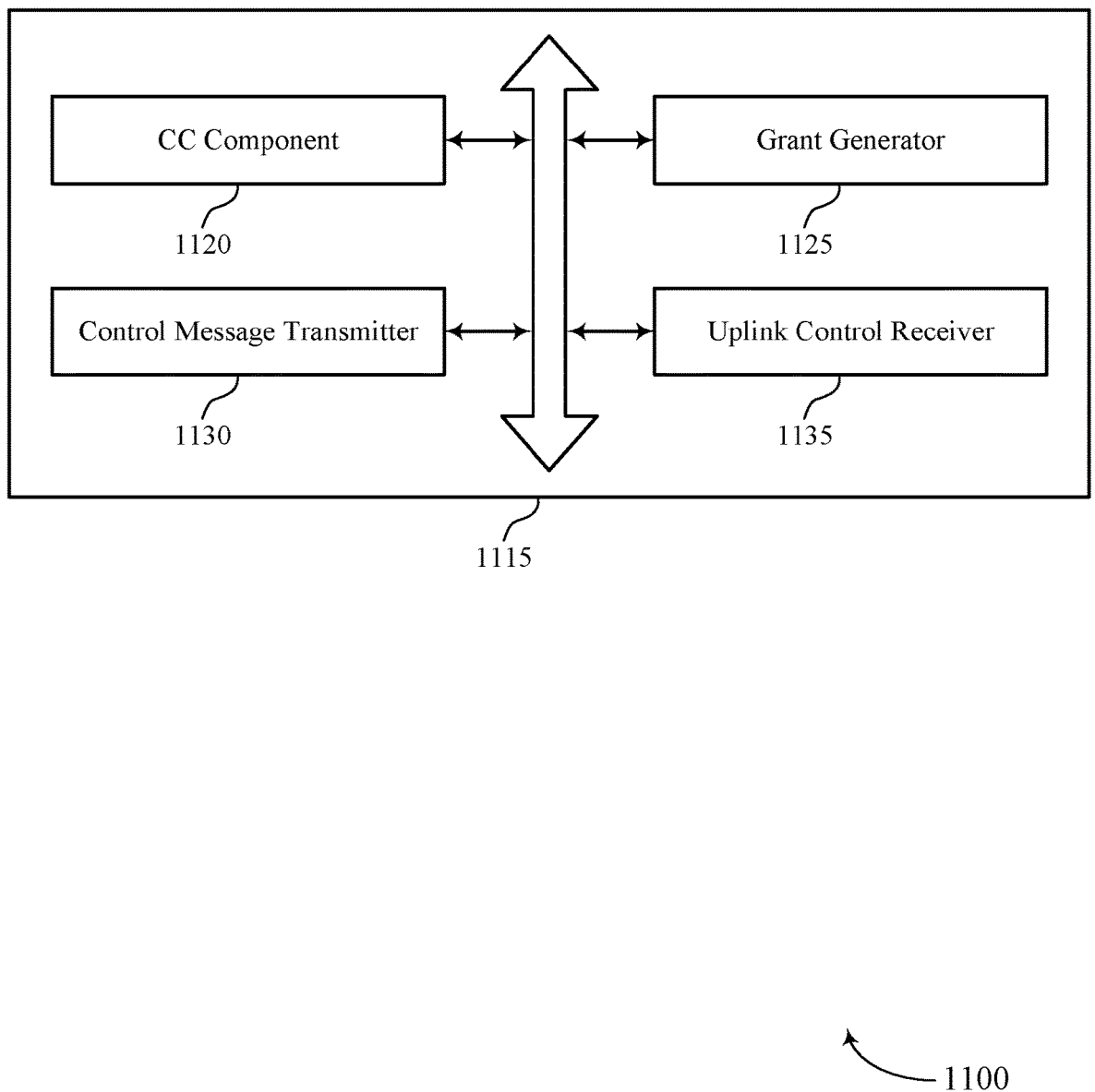

FIG. 11 shows a block diagram 1100 of a base station communications manager 1115 that supports UCI piggybacking in wireless systems in accordance with aspects of the present disclosure. The base station communications manager 1115 may be an example of aspects of a base station communications manager 1215 described with reference to FIGS. 9, 10, and 12. The base station communications manager 1115 may include CC component 1120, grant generator 1125, control message transmitter 1130, and uplink control receiver 1135. Each of these modules may communicate, directly or indirectly, with one another (e.g., via one or more buses).

CC component 1120 may identify a CC to be used by a UE for transmission of UCI on a shared channel. In some cases, the CC indication indicates a CC index for transmission of UCI.

Grant generator 1125 may generate a grant for communication with the base station, the grant including an indication of the identified CC. In some cases, generating the grant may include jointly encoding downlink control information and the indication of the identified CC. In some cases, the grant for communication with the base station includes a field that signals the CC index. In some cases, the grant for communication with the base station includes one of an uplink grant or a downlink grant.

Control message transmitter 1130 may transmit, to the UE, a downlink control message that includes the grant.

Uplink control receiver 1135 may receive, from the UE, UCI via the identified CC based at least in part on the grant, receive, from the UE, UCI via a PCC or an SCC associated with an uplink shared channel transmission, and receive, from the UE, UCI via an SCC associated with a lowest carrier index of a set of carrier indices corresponding to available SCCs.

Figure 12:
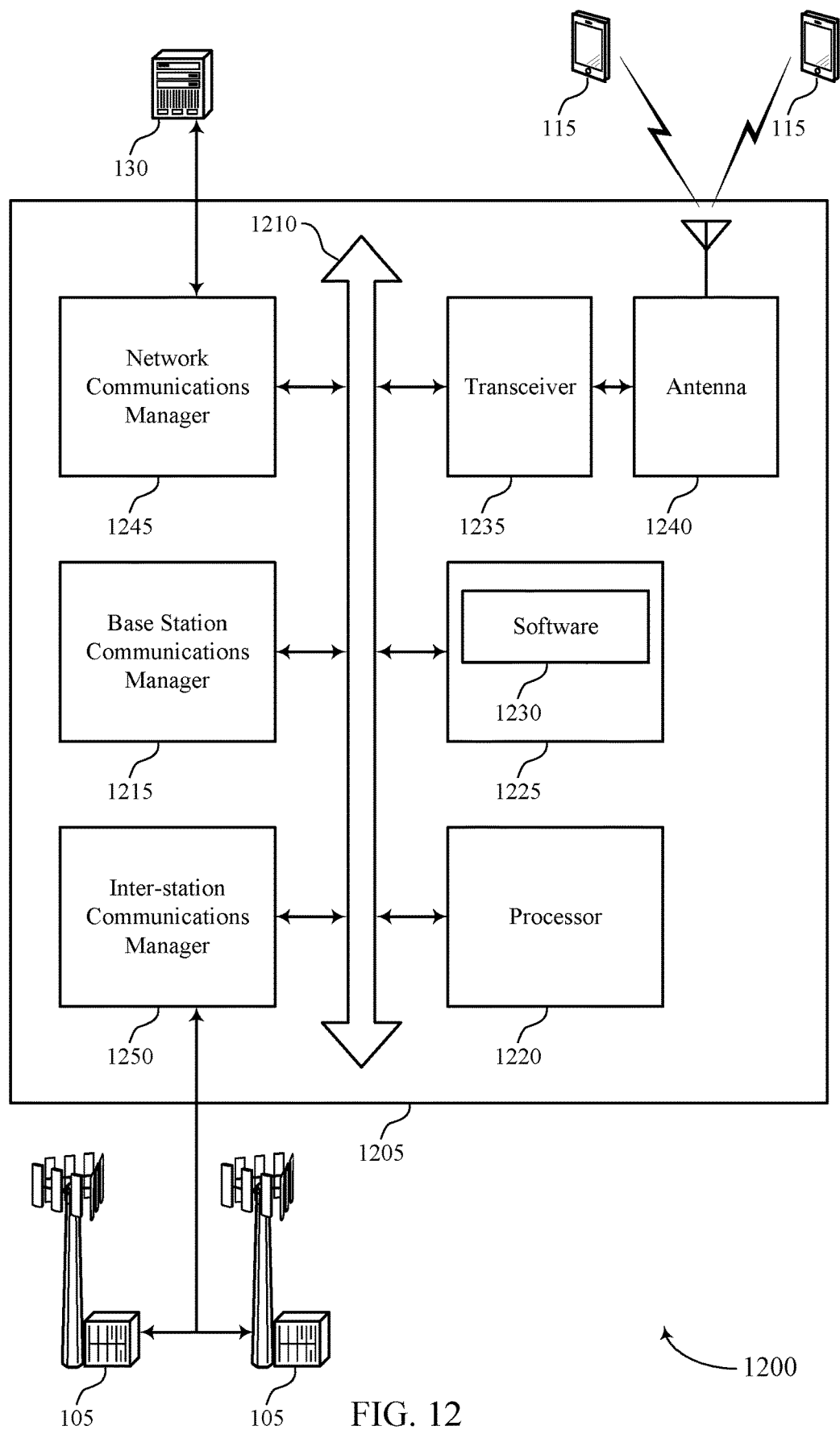
FIG. 12 illustrates a block diagram of a system including a base station that supports UCI piggybacking in accordance with aspects of the present disclosure.

FIG. 12 shows a diagram of a system 1200 including a device 1205 that supports UCI piggybacking in wireless systems in accordance with aspects of the present disclosure. Device 1205 may be an example of or include the components of base station 105 as described herein, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting UCI piggybacking in wireless systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support UCI piggybacking in wireless systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
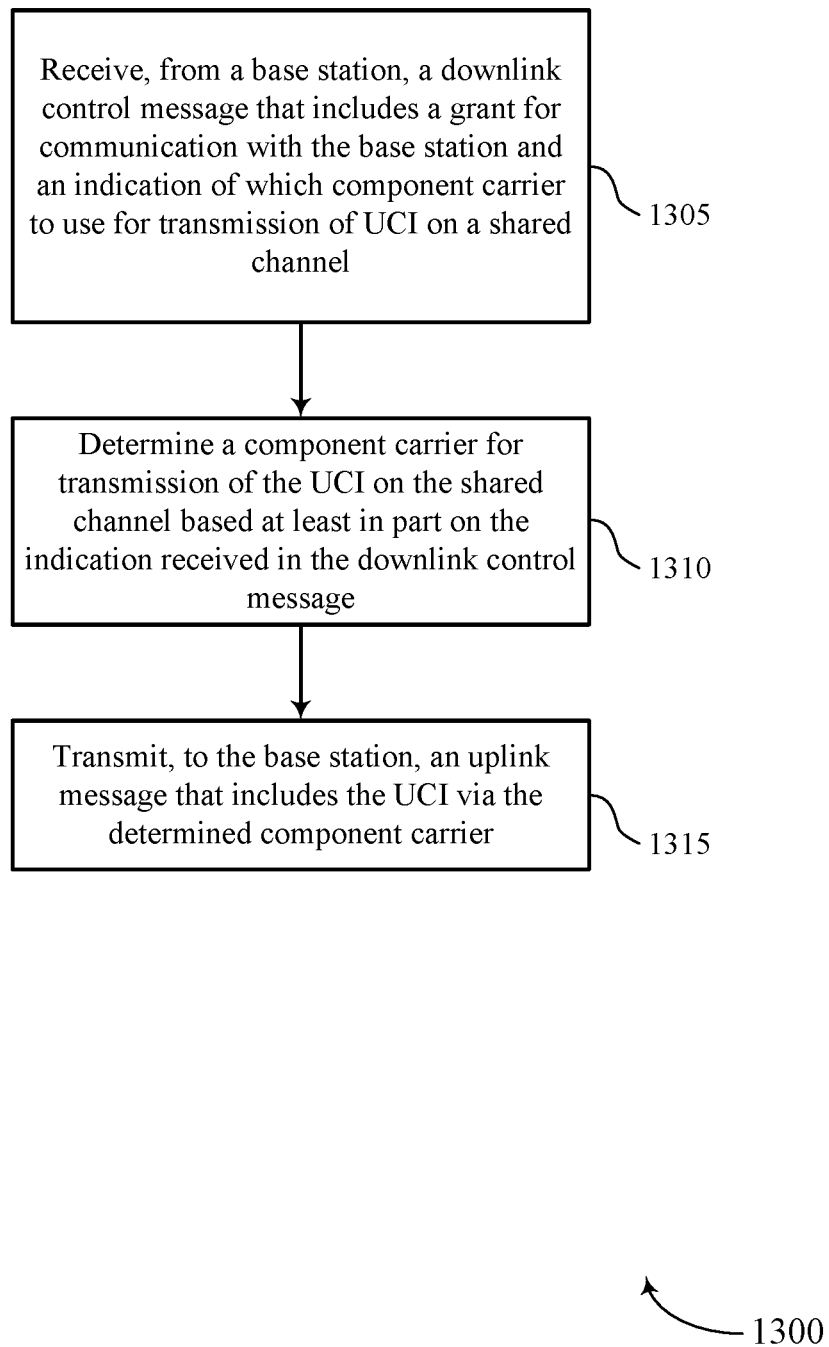
FIGS. 13 through 14 illustrate methods for UCI piggybacking in wireless systems in accordance with aspects of the present disclosure.

FIG. 13 shows a flowchart illustrating a method 1300 for UCI piggybacking in wireless systems in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1305 the UE 115 may receive, from a base station, a downlink control message that may include a grant for communication with the base station and an indication of which CC to use for transmission of UCI on a shared channel. The operations of 1305 may be performed according to the methods described herein. In certain examples, aspects of the operations of 1305 may be performed by a control message receiver as described with reference to FIGS. 5 through 8.

At 1310 the UE 115 may determine a CC for transmission of the UCI on the shared channel based at least in part on the indication received in the downlink control message. The operations of 1310 may be performed according to the methods described herein. In certain examples, aspects of the operations of 1310 may be performed by a CC determination component as described with reference to FIGS. 5 through 8.

At 1315 the UE 115 may transmit, to the base station, an uplink message that may include the UCI via the determined CC. The operations of 1315 may be performed according to the methods described herein. In certain examples, aspects of the operations of 1315 may be performed by an uplink message transmitter as described with reference to FIGS. 5 through 8.

Figure 14:
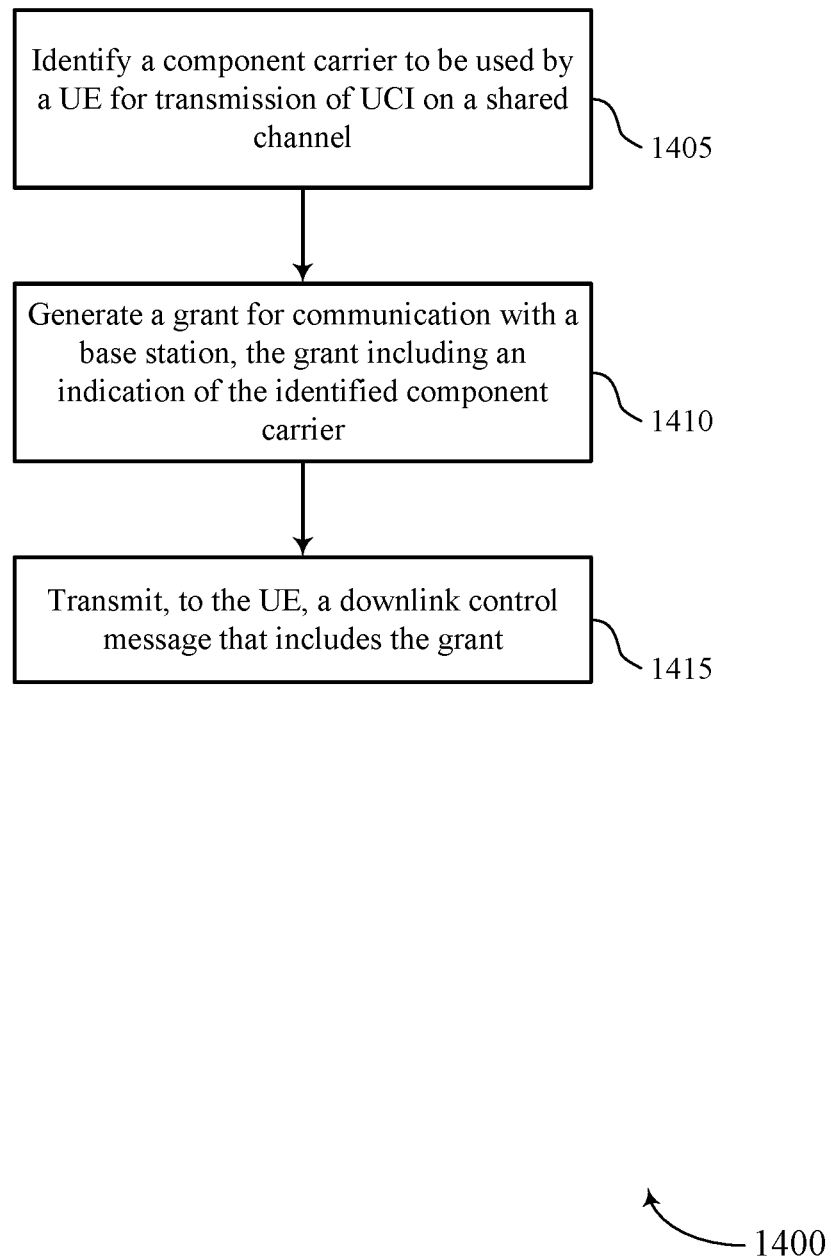

FIG. 14 shows a flowchart illustrating a method 1400 for UCI piggybacking in wireless systems in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 1405 the base station 105 may identify a CC to be used by a UE for transmission of UC) on a shared channel. The operations of 1405 may be performed according to the methods described herein. In certain examples, aspects of the operations of 1405 may be performed by a CC component as described with reference to FIGS. 9 through 12.

At 1410 the base station 105 may generate a grant for communication with a base station, the grant including an indication of the identified CC. The operations of 1410 may be performed according to the methods described herein. In certain examples, aspects of the operations of 1410 may be performed by a grant generator as described with reference to FIGS. 9 through 12.

At 1415 the base station 105 may transmit, to the UE, a downlink control message that includes the grant. The operations of 1415 may be performed according to the methods described herein. In certain examples, aspects of the operations of 1415 may be performed by a control message transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   receiving, from a base station, a downlink control message that comprises a grant for communication with the base station and an indication of which component carrier to use for transmission of uplink control information (UCI) on a shared channel, wherein the downlink control message comprises scheduling information for an uplink shared channel transmission on a first component carrier, and wherein the indication indicates a second component carrier different from the first component carrier;
   determining a set of uplink channel resources on the first or second component carrier for transmission of the UCI based at least in part on the indication received in the downlink control message and a channel configuration of the UE; and
   transmitting, to the base station, an uplink message that comprises the UCI via the determined component carrier based at least in part on the determined set of uplink channel resources.

2. The method of claim 1, further comprising:
   determining that the channel configuration of the UE is for simultaneous control channel and shared channel transmissions; and
   identifying the set of uplink channel resources as a set of uplink control channel resources configured for the second component carrier, wherein the uplink message is transmitted via the second component carrier using the set of uplink control channel resources.

3. The method of claim 1, further comprising:
   determining that the channel configuration of the UE is for simultaneous control channel and shared channel transmissions; and
   determining that a set of uplink control channel resources is not configured for the second component carrier, wherein the uplink message is transmitted based at least in part on a determination that the set of uplink control channel resources is not configured for the second component carrier.

4. The method of claim 3, wherein transmitting the uplink message comprises:
   transmitting the uplink message via an uplink primary component carrier based at least in part on a shared channel transmission scheduled on the uplink primary component carrier.

5. The method of claim 3, wherein transmitting the uplink message comprises:
   transmitting the uplink message via a secondary component carrier that has a shared channel transmission scheduled.

6. The method of claim 5, wherein the secondary component carrier is associated with a lowest carrier index of a set of carrier indices corresponding to available secondary component carriers.

7. The method of claim 1, further comprising:
   determining that the channel configuration of the UE is not for simultaneous control channel and shared channel transmissions, wherein the uplink message is transmitted based at least in part on a determination that the channel configuration of the UE is not configured for simultaneous control channel and shared channel transmissions.

8. The method of claim 7, wherein transmitting the uplink message comprises:
   transmitting the uplink message via an uplink primary component carrier based at least in part on a shared channel transmission scheduled on the uplink primary component carrier.

9. The method of claim 7, wherein transmitting the uplink message comprises:
   transmitting the uplink message via a secondary component carrier that has a shared channel transmission scheduled.

10. The method of claim 9, wherein the secondary component carrier is associated with a lowest carrier index of a set of carrier indices corresponding to available secondary component carriers.

11. The method of claim 1, further comprising:
    determining that the channel configuration of the UE is a simultaneous control channel and shared channel configuration, wherein the uplink message is transmitted based at least in part on the simultaneous control channel and shared channel configuration.

12. The method of claim 1, further comprising:
    receiving scheduling information for a downlink shared channel transmission from the base station;
    decoding the downlink shared channel transmission based at least in part on the scheduling information; and
    determining feedback information for the downlink shared channel transmission based at least in part on the decoding, wherein the UCI comprises the feedback information.

13. The method of claim 12, wherein transmitting the uplink message comprises:
    transmitting the UCI that comprises the feedback information via an uplink component carrier associated with an uplink shared channel transmission, wherein the indication received in the downlink control message indicates the uplink component carrier.

14. The method of claim 1, wherein the grant for communication with the base station comprises one of an uplink grant or a downlink grant.

15. A method for wireless communication, comprising:
identifying a component carrier to be used by a user equipment (UE) for transmission of uplink control information (UCI) on a shared channel;
transmitting, to the UE, a channel configuration corresponding to simultaneous control channel and shared channel transmissions;
generating a grant for communication with a base station, the grant including an indication of the identified component carrier, wherein the indication indicates a first component carrier;
transmitting, to the UE, a downlink control message that includes the grant, wherein the downlink control message comprises scheduling information for an uplink shared channel transmission on a second component carrier different from the first component carrier; and
receiving, from the UE, UCI via a set of uplink channel resources on the first or second component carrier based at least in part on the channel configuration.

16. The method of claim 15, wherein the receiving, from the UE, UCI via the set of uplink channel resources on the first or second component carrier comprises:
receiving, from the UE, UCI via the identified component carrier based at least in part on the grant.

17. The method of claim 15, wherein the receiving, from the UE, UCI via the set of uplink channel resources on the first or second component carrier comprises:
receiving, from the UE, UCI via a primary component carrier or a secondary component carrier associated with an uplink shared channel transmission.

18. The method of claim 15, wherein the receiving, from the UE, UCI via the set of uplink channel resources on the first or second component carrier comprises:
receiving, from the UE, UCI via a secondary component carrier associated with a lowest carrier index of a set of carrier indices corresponding to available secondary component carriers.

19. The method of claim 15, wherein generating the grant comprises:
jointly encoding downlink control information and the indication of the identified component carrier.

20. The method of claim 15, wherein:
the indication of the identified component carrier indicates a component carrier index for transmission of the UCI; and
the grant for communication with the base station comprises a field that signals the component carrier index.

21. The method of claim 15, wherein the grant for communication with the base station comprises one of an uplink grant or a downlink grant.

22. An apparatus for wireless communication, comprising:
a processor;
memory coupled with the processor; and
instructions stored in the memory and executable by the processor to cause the apparatus to:
receive, from a base station, a downlink control message that comprises a grant for communication with the base station and an indication of which component carrier to use for transmission of uplink control information (UCI) on a shared channel, wherein the downlink control message comprises scheduling information for an uplink shared channel transmission on a first component carrier, and wherein the indication indicates a second component carrier different from the first component carrier;
determine a set of uplink channel resources on the first or second component carrier for transmission of the UCI based at least in part on the indication received in the downlink control message and a channel configuration of the UE; and
transmit, to the base station, an uplink message that comprises the UCI via the determined component carrier based at least in part on the determined set of uplink channel resources.

23. The apparatus of claim 22, wherein the instructions are further executable by the processor to cause the apparatus to:
determine that the channel configuration of the UE is for simultaneous control channel and shared channel transmissions; and
identify the set of uplink channel resources as a set of uplink control channel resources configured for the second component carrier, wherein the uplink message is transmitted via the second component carrier using the set of uplink control channel resources.

24. An apparatus, comprising:
a processor;
memory coupled with the processor; and
instructions stored in the memory and executable by the processor to cause the apparatus to:
identify a component carrier to be used by a user equipment (UE) for transmission of uplink control information (UCI) on a shared channel;
transmit, to the UE, a channel configuration corresponding to simultaneous control channel and shared channel transmissions;
generate a grant for communication with a base station, the grant including an indication of the identified component carrier, wherein the indication indicates a first component carrier;
transmit, to the UE, a downlink control message that includes the grant, wherein the downlink control message comprises scheduling information for an uplink shared channel transmission on a second component carrier different from the first component carrier; and
receive, from the UE, UCI via a set of uplink channel resources on the first or second component carrier based at least in part on the channel configuration.

25. The apparatus of claim 24, wherein the instructions to cause the apparatus to receive, from the UE, UCI via the set of uplink channel resources on the first or second component carrier are further executable by the processor to cause the apparatus to:
receive, from the UE, UCI via the identified component carrier based at least in part on the grant.

* * * * *